No. 768,679. PATENTED AUG. 30, 1904.
L. P. NORMANDIN.
MACHINE FOR MOLDING BUILDING BLOCKS.
APPLICATION FILED MAR. 28, 1904.
NO MODEL. 5 SHEETS—SHEET 1.
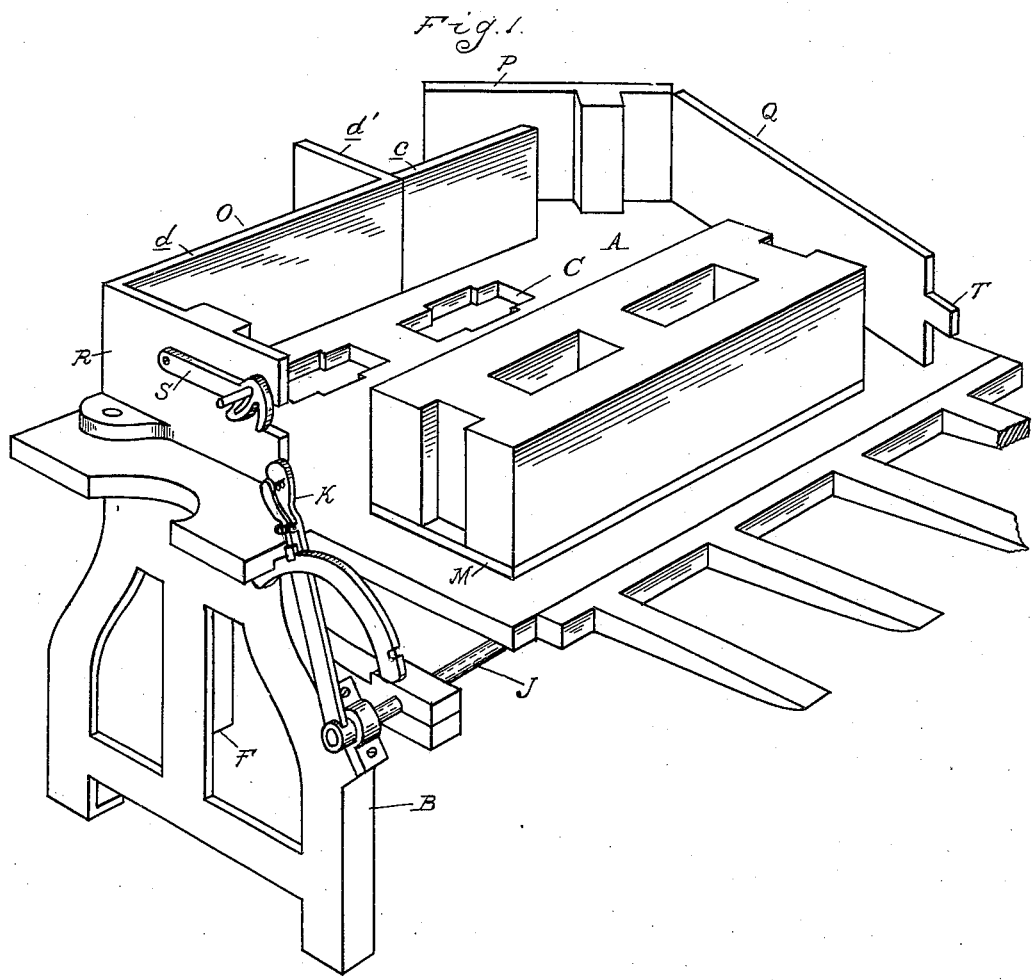
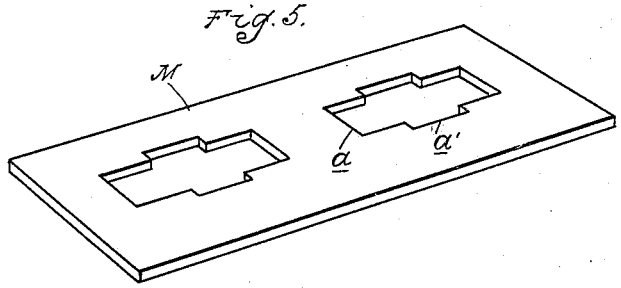
Inventor
Levi P. Normandin
By James Whittemore
Atty.
Witnesses No. 768,679. PATENTED AUG. 30, 1904.
L. P. NORMANDIN.
MACHINE FOR MOLDING BUILDING BLOCKS.
APPLICATION FILED MAR. 28, 1904.
NO MODEL. 5 SHEETS—SHEET 2.
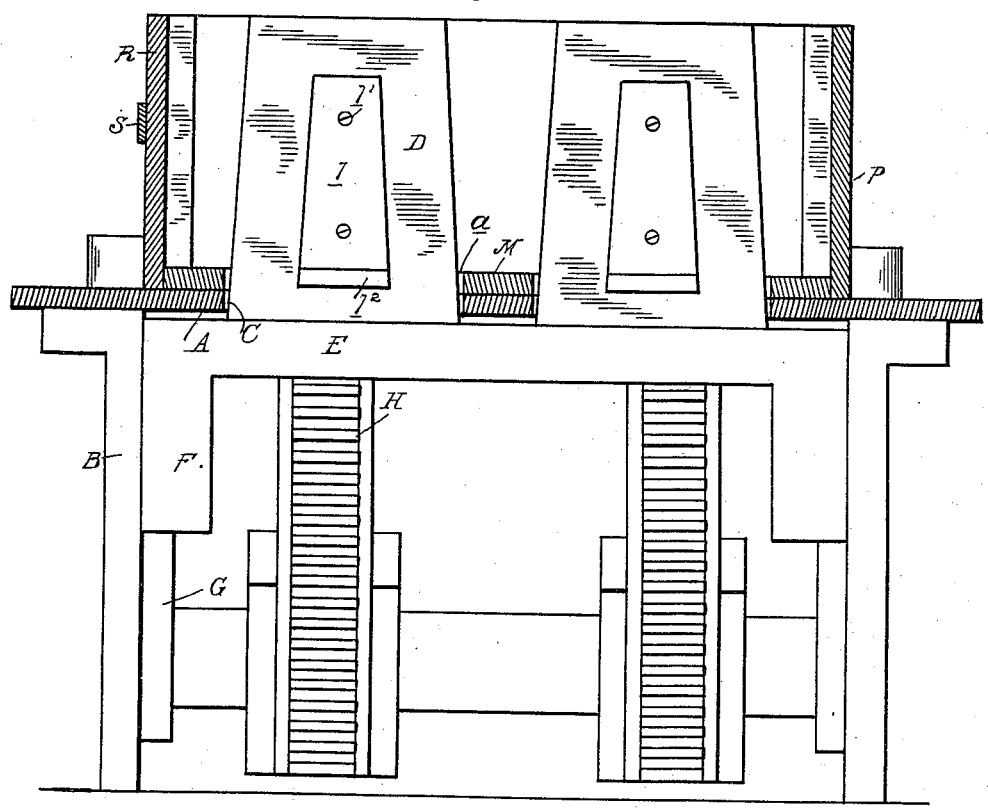
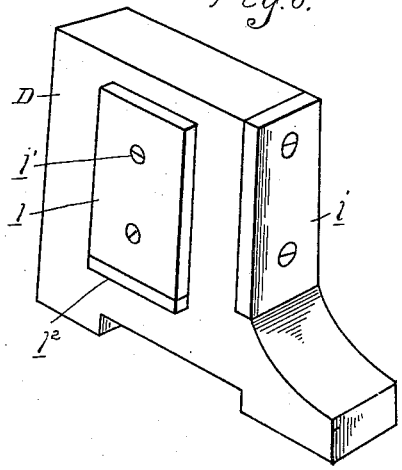
Inventor
Levi P. Normandin
By James Whittemore
Atty.
Witnesses No. 768,679. PATENTED AUG. 30, 1904.
L. P. NORMANDIN.
MACHINE FOR MOLDING BUILDING BLOCKS.
APPLICATION FILED MAR. 28, 1904.
NO MODEL. 5 SHEETS—SHEET 3.
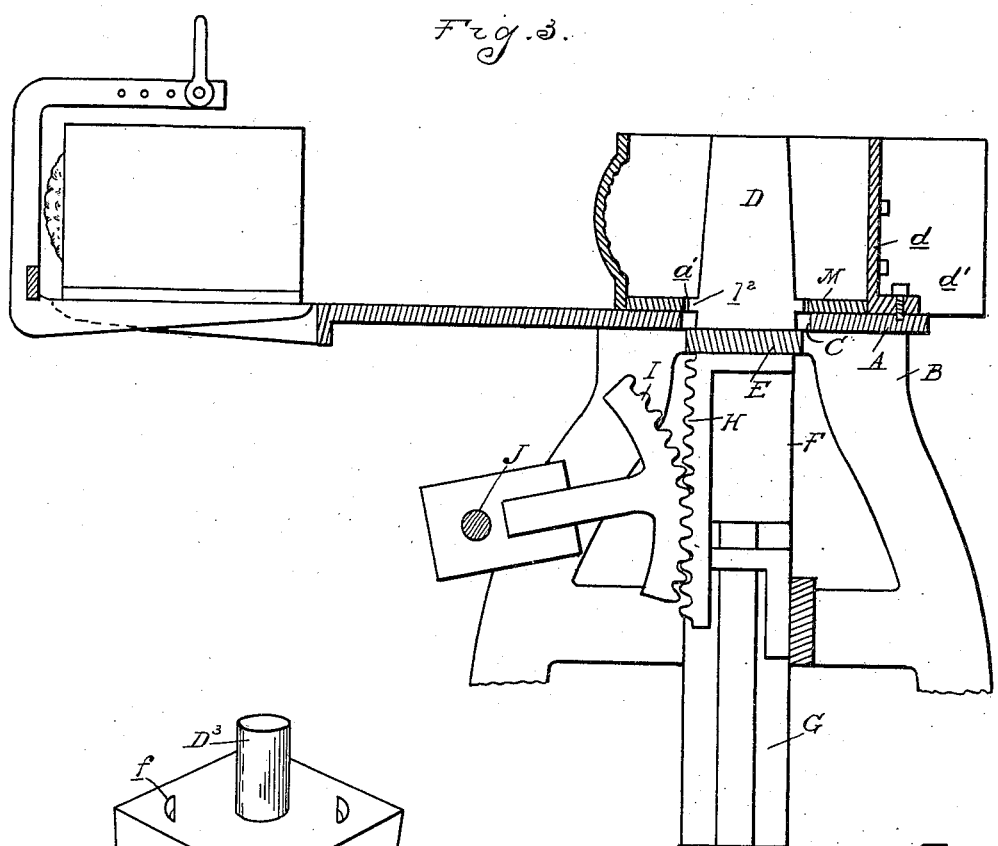
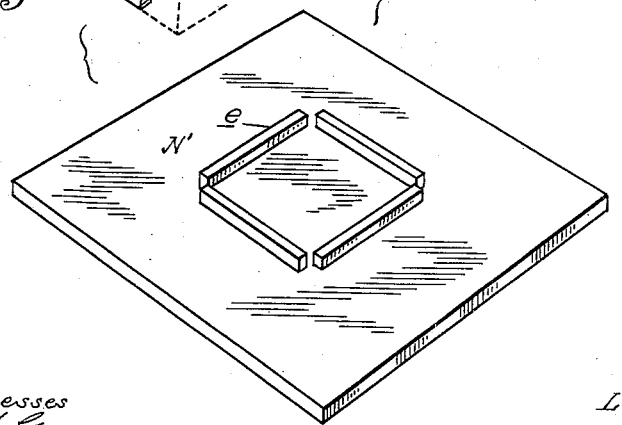
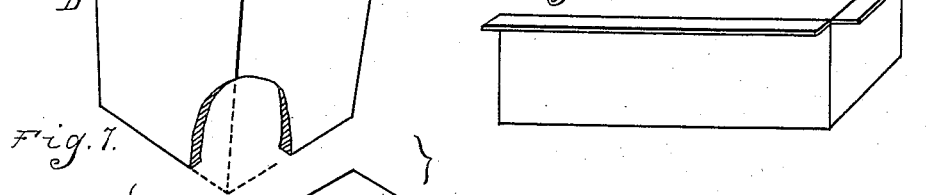
Witnesses
Inventor
Levi P. Normandin
By James Whittemore
Atty.

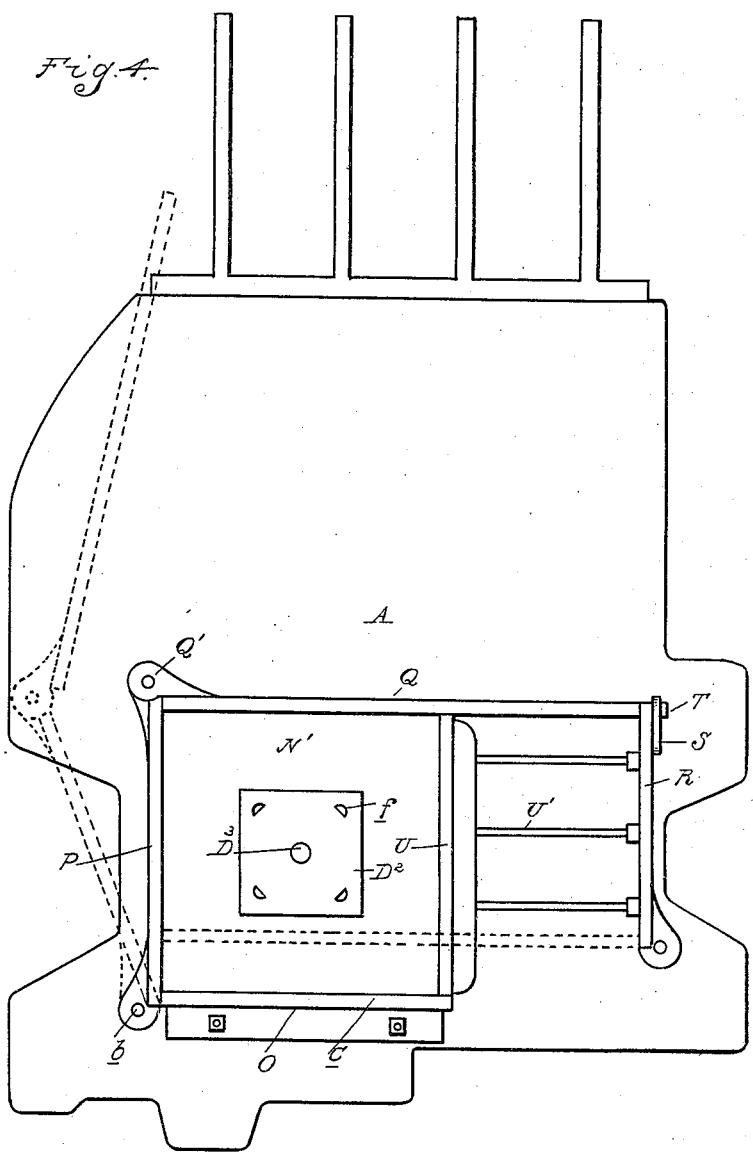

No. 768,679. PATENTED AUG. 30, 1904.
L. P. NORMANDIN.
MACHINE FOR MOLDING BUILDING BLOCKS.
APPLICATION FILED MAR. 28, 1904.
NO MODEL. 5 SHEETS—SHEET 5.
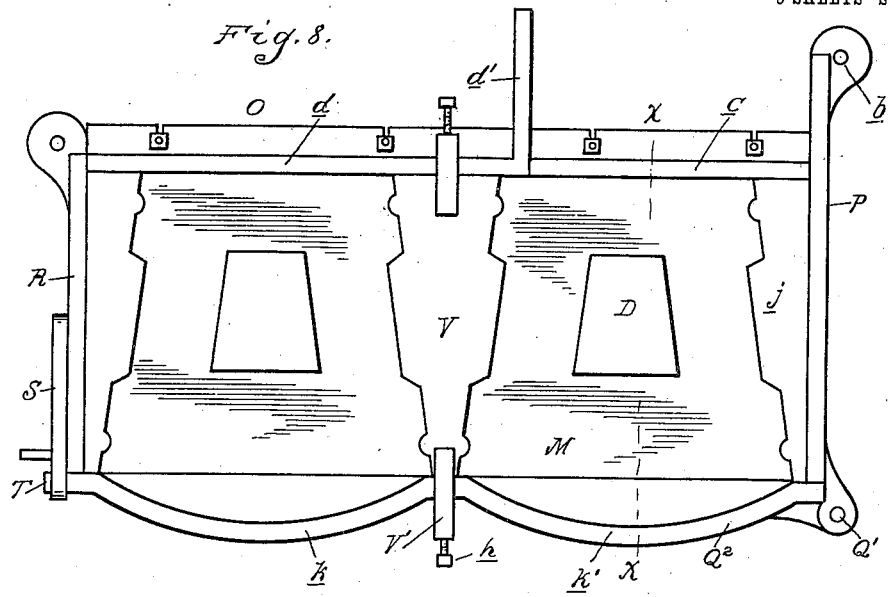
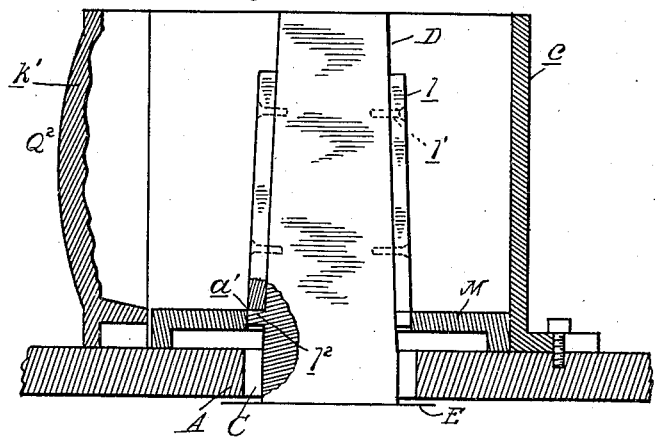
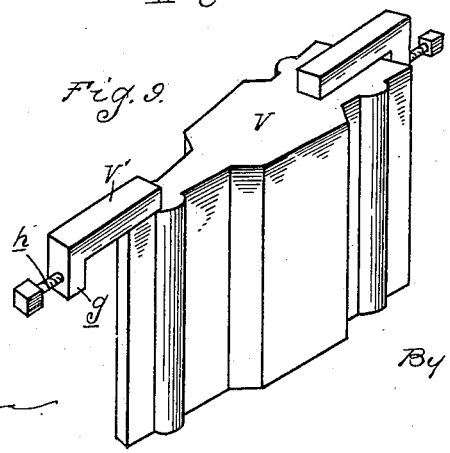
Witnesses
Inventor
Levi P. Normandin
By James Whittemore
Atty.

No. 768,679. Patented August 30, 1904.

UNITED STATES PATENT OFFICE.

LEVI P. NORMANDIN, OF JACKSON, MICHIGAN, ASSIGNOR OF THREE-FOURTHS TO WILLIAM F. COWHAM, OF JACKSON, MICHIGAN.

MACHINE FOR MOLDING BUILDING-BLOCKS.

SPECIFICATION forming part of Letters Patent No. 768,679, dated August 30, 1904.

Application filed March 28, 1904. Serial No. 200,310. (No model.)

*To all whom it may concern:*

Be it known that I, LEVI P. NORMANDIN, a citizen of the United States, residing at Jackson, in the county of Jackson and State of Michigan, have invented certain new and useful Improvements in Machines for Molding Building-Blocks, of which the following is a specification, reference being had therein to the accompanying drawings.

The invention relates to machines for the manufacture of building-blocks from plastic material, such as sand and cement.

It is the object of the invention to obtain a construction in which a variety of shapes and sizes of blocks may be produced and in which the machine may be quickly adjusted to adapt it for the different work.

To this end the invention consists in certain features of construction to be hereinafter set forth.

In the drawings, Figure 1 is a perspective view of a machine as adjusted for manufacturing one form of blocks. Fig. 2 is a cross-section therethrough. Fig. 3 is a section at right angles to Fig. 2. Fig. 4 is a plan view illustrating the machine as adjusted for forming a different style of block. Fig. 5 is a perspective view of one of the bottom plates detached. Fig. 6 is a perspective view of one of the cores detached. Fig. 7 is a perspective view of the core and bottom plate used by the machine as adjusted in Fig. 4. Fig. 8 is a plan view illustrating another adjustment of the machine. Fig. 9 is a perspective view of the division-plate used in Fig. 8. Fig. 10 is a perspective view of the division-diaphragm for separating the facing material in the block from the body portion. Fig. 11 is a cross-section on line *x x*, Fig. 8.

In my improved construction the machine belongs more particularly to that type adapted for the manufacture of hollow blocks and in which the cores which form the hollow space within the block are removed before the removal of the outer mold.

In the manufacture of blocks for building purposes it is desirable to provide a variety of forms. The principal shapes ordinarily required are, first, oblong rectangular blocks; second, L-shaped angle-blocks; third, substantially square blocks for porch-columns, &c.; fourth, oblong rectangular blocks which are a fraction of the length of the standard block; fifth, angle-faced blocks which are adapted for forming bay-windows and other angular projections in the building-wall, and, sixth, blocks of different widths for forming walls of different thickness.

With my present invention I have obtained a machine which is adapted for forming all of the various forms of blocks above mentioned, and the machine is so constructed that it may be quickly adjusted for forming the particular block required.

A is a suitable bed or table upon which the mold is supported. This bed is mounted upon standards, such as B, and have formed at one end thereof apertures C, through which the cores may be raised or lowered. These cores D are mounted upon a vertically-movable cross-head E, which has at opposite sides thereof shoes F, engaging with guideways G on the standards B.

H represents racks secured to and depending from the cross-head, and I represents segmental gears secured to a rock-shaft J, which is journaled in bearings upon the standards B and is provided with an operating-lever K. Thus by a movement of the lever K the shaft may be rocked to raise or lower the head E and to project the cores or to withdraw them beneath the bed.

The cores D are of various sizes and shapes, according to the particular form of block to be made. In order that they may be quickly exchanged one for another, they are detachably secured to the cross-head E by suitable means, such as bolts or screws. For the oblong rectangular block 2 cores are preferably employed, which are spaced from each other at the center and are also spaced from the ends of the mold, as will be hereinafter described.

M is a bottom plate or pallet upon which the block rests during the process of molding and upon which it remains until the cement is hardened. This plate is formed of the size and shape of the block and is provided with apertures *a*, through which the cores D pass when in their raised position. The outer mold for forming the block is supported upon the bed A and is of the following construction: O is the plate, forming one side of the mold, which is bolted or otherwise rigidly secured to the bed A. P is a second plate, which is hinged or pivotally secured to the bed at $b$ and is arranged to swing thereon in a horizontal plane. Q is a third plate, which is hinged to the plate P; but the hinge Q' is of such construction as to limit the swinging movement of the plate Q in relation to the plate P. R is a fourth plate, which is hinged to the bed and extends parallel to the plate P and at right angles to the plate Q when in normal position. The plate O is preferably formed in two or more sections, which are removable from the bed. This is for the purpose of forming angle-blocks by the removal and rearward adjustment of one of the sections, $c$, of the plate O. For this purpose the plate P is also made of greater length than the width of the oblong rectangular block, so that it is capable of forming one side of the L. The other section, $d$, of the plate O is preferably formed of an angle-plate, so that when the section $c$ is adjusted rearward the side $d'$ of the angle will complete the mold. The plates R and Q are locked to each other at their adjacent ends by suitable means, such as the latch S, which is pivotally secured to the plate R and is adapted to engage with the lug T, projecting from the end of the plate Q. When thus engaged, the plates R and Q will be locked to each other, and the plates R and P will be held to the bed by their pivotal connections, while the plate O is rigidly attached to the bed. Thus when the bottom plate M is arranged in position and inclosed by the hinged side plates a rigid mold will be formed in which the plastic material may be placed intact without distortion of the shape of the mold. The width of the mold may be adjusted by changing the position of the plate O, as indicated by dotted lines in Fig. 4. In the said figure the full lines show an arrangement of the mold adapted for the formation of square blocks, and for such construction the section $c$ of the rigid plate is moved backward, so as to be adjacent to the pivot of the hinged section P. The sections P and Q form two of the remaining sides of the mold, and the fourth side, U, is formed by a plate which extends from the plate Q to the plate $c$. The plate U is held in position by rearwardly-extending rods U', which at their rear ends bear against the plate R, and as the latter is locked to the plate Q the plate U is held from displacement. Thus a square block, and one of greater diameter than the width of the oblong block, may be made in the oblong mold by the use of a single extra plate—namely, the plate U. The core $D^2$ for the block in this square mold is preferably not attached to the raising and lowering cross-head, but is entirely separate and is held in position by ribs $e$ on the bottom plate N'. The core itself is formed of a hollow substantially rectangular block, which is provided with a handle $D^3$ at its upper end for insertion and removal from the mold. The sides of this block are sufficiently tapered toward the bottom to allow of drawing the core upward, and in order to facilitate this operation apertures $f$ are formed to relieve the air pressure or suction which would be caused by the withdrawal of a solid core from the body of plastic material.

As has been stated, the oblong rectangular blocks are preferably formed with two core-openings, which are spaced from each other at the center and are spaced at the ends from the plates R and P of the outer mold. For forming a block a half-length division-plate V is placed to extend centrally across the mold between the plates Q and O thereof. This division-plate is secured in position by being provided with outwardly-extending lugs V' at its upper end, which have depending portions $g$, with which set-screws $h$ engage. Thus by clamping the sides Q and O of the mold with the set-screws $h$ the division-plate V is held in position. The cores D are preferably provided with detachable end plates $i$, which may be removed when the division-plate V is used, so as to compensate for the space occupied by said division-plate and form a wall between the division-plate and core which is equal to the wall between the core and the end plate of the mold.

Where it is desired to make angle-blocks, the division-plate V may be of wedge-shape form, as shown in Figs. 8 and 9, and the end plates R and P have detachably secured thereto corresponding wedge-shaped blocks $j$. In Fig. 8 is shown a construction in which the front face of these angle-blocks may be formed of segmental shape. For this purpose the plate Q is replaced by a modified construction $Q^2$, which has outwardly-grooved segmental portions $k$ and $k'$, which at the center merge in the plane connecting the ends of the plates R and P. This modified plate $Q^2$ is hinged to the plate P in the same manner as the plate Q and is also locked to the plate R by the latch S in the same manner. By its use in connection with the division-plate V and the block $j$ two angle-blocks may be formed, each of which is provided with a segmental outer face, and this outer face may be formed in imitation of rough-hewn stone by suitably loosening the plate $Q^2$.

To facilitate the handling of the blocks in the construction of a building, the core-openings are preferably formed with undercut recesses in the sides thereof, with which a lifter may be engaged. For forming these undercut recesses the cores D are provided with projecting bosses $l$ on their opposite faces. Where these lifting-shoulders are not desired, the bosses $l$ are removed and to this end are detachably secured to the core-blocks D by suitable means, such as the screws $l'$. The bottom plate M is formed with the apertures $a$ for the passage of the cores and $a'$ for the passage of the bosses $l$ where attached to the cores, and where these bosses are removed the spaces $a$ are filled by permanently-attached ribs $l^2$ on the cores D.

What I claim as my invention is—

1. In a machine for molding blocks the combination with a bed, of an articulated frame thereon forming an oblong rectangular mold, and comprising end plates pivotally attached to the bed, a connecting-plate hinged to the free end of one of said end plates, and having a clamping engagement with the free end of the opposite end plate, a plate rigidly clamped upon the bed parallel to said hinged plate, and a loose plate extending between said rigid plate and said hinged plate and provided with rearwardly-extending bearings abutting against one of said end plates, whereby a substantially square mold is formed of lesser length than said oblong rectangular mold.

2. A machine for molding blocks comprising a bed, an articulated frame thereon consisting of two end plates pivotally attached to said bed, a third plate hinged to the free end of one of said pivotal plates, and having a clamping engagement with the free end of the opposite pivotal plate, a plate rigidly clamped to said bed parallel to said hinged plate, a rectangular bottom plate of lesser length than said hinged plate extending between the latter, and said rigid plate, and a loose plate extending between said hinged plate and rigid plate, and bearing against said bottom plate, said loose plate being provided with arms extending outward and bearing against the pivotal plate whereby said loose plate is held in position.

3. A machine for molding blocks comprising a bed, an articulated frame thereon consisting of two plates pivotally connected to the bed, a third plate hinged to the free end of one of said pivotal plates, and having a detachable clamping engagement with the free end of the opposite pivotal plate, a plate rigidly secured to the bed parallel to said hinged plate, a bottom plate of lesser length than said hinged plate and arranged between the latter and said rigid plate, said bottom plate being substantially square, a downwardly-tapering core resting centrally upon said bottom plate, lugs on said bottom plate for engaging and centering said core, and a loose plate for the remaining side of said bottom plate held in position by bearings extending outward against said pivotal plate.

In testimony whereof I affix my signature in presence of two witnesses.

LEVI P. NORMANDIN.

Witnesses:
 JAMES P. BARRY,
 H. C. SMITH.